United States Patent
Knoll et al.

(10) Patent No.: US 12,351,519 B2
(45) Date of Patent: Jul. 8, 2025

(54) COLD-SETTING DRY VIBRATABLE MIX

(71) Applicant: INTOCAST AG, Ratingen (DE)

(72) Inventors: Manfred Knoll, Melsbach (DE);
Natalie Fröse, Oberhausen (DE)

(73) Assignee: INTOCAST AG FEUERFEST-PRODUKTE UND GIESSLFSMITTEL, Ratingen (DE)

(*) Notice: Subject to any disclaimer, the term of this patent is extended or adjusted under 35 U.S.C. 154(b) by 965 days.

(21) Appl. No.: 17/432,365

(22) PCT Filed: Feb. 20, 2020

(86) PCT No.: PCT/EP2020/054547
§ 371 (c)(1),
(2) Date: Feb. 17, 2022

(87) PCT Pub. No.: WO2020/169771
PCT Pub. Date: Aug. 27, 2020

(65) Prior Publication Data
US 2022/0185736 A1    Jun. 16, 2022

(30) Foreign Application Priority Data
Feb. 20, 2019 (DE) .......................... 202019000813.6

(51) Int. Cl.
| | | |
|---|---|---|
| *C04B 28/34* | (2006.01) | |
| *C04B 24/04* | (2006.01) | |
| *C04B 40/00* | (2006.01) | |
| *C04B 103/20* | (2006.01) | |

(52) U.S. Cl.
CPC ............ *C04B 28/344* (2013.01); *C04B 24/04* (2013.01); *C04B 40/0067* (2013.01); *C04B 2103/20* (2013.01)

(58) Field of Classification Search
CPC ... C04B 28/344; C04B 24/04; C04B 40/0067; C04B 2103/20; C04B 2235/449; C04B 35/06; C04B 35/14; C04B 35/20; C04B 35/447; C04B 35/6313; C04B 35/66; C04B 35/043; C04B 2111/00431; C04B 2111/28; C04B 28/105; C04B 28/34; B22D 41/02; F27D 1/0006
See application file for complete search history.

(56) References Cited

U.S. PATENT DOCUMENTS

| | | | | |
|---|---|---|---|---|
| 5,124,288 A | * | 6/1992 | Ishikawa | ................. C04B 35/03 266/286 |
| 2016/0019992 A1 | * | 1/2016 | Cau Dit Coumes | .. C04B 28/346 106/14.12 |

FOREIGN PATENT DOCUMENTS

| | | | | |
|---|---|---|---|---|
| CA | 2690159 A1 | * | 1/2009 | ............. B22D 41/02 |
| CN | 1021305 C | | 6/1993 | |
| DE | 102007032892 A1 | | 1/2019 | |
| EP | 0218363 A1 | | 4/1987 | |
| FR | 2809724 A1 | | 12/2001 | |

OTHER PUBLICATIONS

Int'l. Search Report from priority Int'l. Application No. PCT/EP2020/054547, European Patent Office, May 26, 2020.
Int'l. Preliminary Report on Patentability and Written Opinion (English translation) from priority Int'l. Application No. PCT/EP2020/054547, European Patent Office, Aug. 10, 2021.

* cited by examiner

*Primary Examiner* — Colin W. Slifka
(74) *Attorney, Agent, or Firm* — UB Greensfelder LLP; Brian E. Turung

(57) ABSTRACT

The invention relates to a refractory dry vibratable mix which sets at room temperature when water is added, for use in metallurgical vessels and comprising a refractory main component, a binder and a retarder.

2 Claims, No Drawings

COLD-SETTING DRY VIBRATABLE MIX

PRIORITY INFORMATION

The present invention is a national stage application of International Application Serial No. PCT/EP2020/054547, filed Feb. 20, 2020, which in turn claims priority to German Application Serial No. 20 2019 000 813.6, filed Feb. 20, 2019, each of which is incorporated herein by reference.

FIELD OF THE INVENTION

The invention relates to a dry vibratable mix for use in metallurgical vessels, which sets at room temperature when water is added, characterized by a refractory main component, a binder and a retardant.

TECHNICAL BACKGROUND

The invention concerns an unshaped refractory dry vibratable mix which in particular sets at room temperature. Preferably, this is used as a dry vibratable mix for lining metallurgical vessels, for example of a tundish or the like, and can be described as a cold-setting tundish dry vibratable mass.

In the case of unshaped refractory masses, these are usually a mixture which consists of a refractory main component (for example MgO, $SiO_2$, sintered dolomite, olivine) and one or more binders.

Setting of refractory masses of this type may be carried out using organic or indeed inorganic binders, or in fact combinations of the two.

Thus, for example, dried dry vibratable mixes are known which contain powdered phenol resin as a binder. Hardening of these dry vibratable mixes takes place at approximately 200-250° C. Furthermore, cold-setting dry vibratable mixes are employed. In this case, a 2-component binder system is used in the liquid form, such as water glass/ester or resin/ester combinations.

However, these systems suffer from several disadvantages. Thus, for example, the tacky water glass could result in abrasion of specific machine parts. Binder systems containing resin result in odor and emissions, for example because of the release of ammonia. Other disadvantages of these binders are linked to their limited storage capability.

However, binders are known which are added to a dry vibratable mix in powdered form and are then activated by the addition of water as a reactant or as a solvent. Under certain circumstances, dry vibratable mixes which are currently known which are based on acid/base binder systems can result in the release of sulphur-containing compounds. Furthermore, when using calcium supports as bases, the CaO uptake in many grades of steel may be considered to be undesirable.

DESCRIPTION OF THE INVENTION

From the foregoing, the objective of the invention is to provide an improved dry vibratable mix for use in metallurgical vessels, which sets at room temperature when water is added, characterized by a refractory main component, a binder and a retardant.

This objective is achieved by means of a refractory dry vibratable mix for use in metallurgical vessels, which sets at room temperature when water is added, characterized by a refractory main component, a binder and a retardant.

The dry vibratable mix in accordance with the invention advantageously contains the binder components in the powdered form and can set at room temperature when water is added as a solvent or reactant, but does not suffer from the disadvantages described above.

In one embodiment, a binder consisting of magnesium oxide and an alkali phosphate (for example potassium dihydrogen phosphate or an alkali polyphosphate) or ammonium dihydrogen phosphate or mixtures of these phosphates is provided. Preferably, the phosphate which is used is a potassium dihydrogen phosphate. Magnesium oxide and potassium dihydrogen phosphate react by taking in water to form crystalline potassium magnesium phosphate hexahydrate (set product). The water which is added acts both as a solvent and as a reactant in which it is taken up as water of crystallization. Upon heating, annealing-resistant magnesium pyrophosphate is formed at approximately 250° C. Beyond approximately 1000° C., this is converted into magnesium phosphate.

Furthermore, the refractory mass in accordance with the invention is characterized in that it contains at least one retardant in the form of a carboxylic acid. The carboxylic acid used is, for example, citric acid, tartaric acid, malic acid, maleic acid, etc.

Further features and embodiments of the invention are a refractory dry vibratable mix for use in metallurgical vessels, which sets at room temperature when water is added, characterized by a refractory main component, a binder and a retardant. The main component can comprise or can be a sintered magnesia, fused magnesia, olivine, quartz, sintered dolomite and/or secondary raw materials based on MgO. The binder can be based on magnesium oxide and an alkali phosphate and/or ammonium dihydrogen phosphate. The alkali phosphate can comprise or can be potassium dihydrogen phosphate and/or alkali polyphosphate. The retardant can be in the form of a carboxylic acid, in particular citric acid, tartaric acid, malic acid, maleic acid or malonic acid. The dry vibratable mix can comprise (as a % by weight): 5-95% of MgO or olivine, and/or amorphous SiO2, <1%, and/or carboxylic acid, >1%<5%, and/or alkali phosphate, >1%<5%. The refractory component can be magnesia and no additional MgO. The refractory component can be magnesia and in particular additional MgQ, <2% by weight, <1% by weight, <0.1% by weight MgO.

The invention claimed is:

1. A refractory dry vibratable mix that is formulated to set at room temperature when water is added to said refractory dry vibratable mix; said refractory dry vibratable mix includes a refractory main component, a binder and a retardant; said refractory main component constitutes 5-95 wt. % of said refractory dry vibratable mix; said refractory main component is formed of one or more of sintered magnesia, fused magnesia, olivine, quartz, and sintered dolomite; said binder constitutes >1-<5 wt. % of said refractory dry vibratable mix; said binder includes ammonium dihydrogen phosphate; said retardant constitutes >1-<5 wt. % of said refractory dry vibratable mix; said retardant includes carboxylic acid; said refractory dry vibratable mix includes less than 1 wt. % $SiO_2$.

2. A refractory dry vibratable mix that is formulated to set at room temperature when water is added to said refractory dry vibratable mix; said refractory dry vibratable mix includes a refractory main component, a binder and a retardant; said refractory main component constitutes 5-95 wt. % of said refractory dry vibratable mix; said refractory main component is formed of one or more of sintered magnesia, fused magnesia, olivine, quartz, and sintered dolomite; said binder constitutes >1-<5 wt. % of said refractory dry vibratable mix; said binder includes a) ammonium dihydrogen phosphate, b) magnesium oxide and potassium dihydrogen phosphate, and wherein said magnesium oxide is absent sintered magnesia, fused magnesia, olivine, quartz, and sintered dolomite, or c) magnesium oxide and alkali polyphosphate, and wherein said magnesium oxide is absent sintered magnesia, fused magnesia, olivine, quartz, and sintered dolomite; said retardant constitutes >1-<5 wt. % of said refractory dry vibratable mix; said retardant includes carboxylic acid; said refractory dry vibratable mix includes less than 1 wt. % $SiO_2$.

* * * * *